Patented Feb. 7, 1950

2,497,054

UNITED STATES PATENT OFFICE 2,497,054

PREPARATION OF CATION ACTIVE RESINS

Harold M. Day, Cos Cob, Conn., assignor to American Cyanamid Company, New York, N. Y., a corporation of Maine No Drawing. Application September 4, 1946, Serial No. 694,817

5 Claims. (Cl. 260—49)

This invention relates to cation active synthetic resins and more particularly, to cationic synthetic resins prepared from 4,4'-dihydroxydiphenyl sulfone, formaldehyde and an alkaline sulfiting agent, to methods of preparing such resins, and to the use of the resins for the removal of cations from, or the exchange of cations in, liquid media.

Water-soluble condensation products of 4,4'-dihydroxydiphenyl sulfone, formaldehyde and sodium sulfite or similar sulfiting agent are known and their use as tanning agents is disclosed in such patents as No. 2,036,161 and No. 2,320,678.

I have discovered that water-insoluble materials suitable for the removal of cations from liquids may be prepared by bringing about reaction between 4,4'-dihydroxydiphenyl sulfone, formaldehyde and an alkaline sulfiting agent.

The present invention will be described in greater detail in conjunction with the following specific example in which the proportions are given in parts by weight. This example is merely illustrative, and it is not intended that the scope of the invention be restricted to the details therein set forth.

Example 125 parts of 4,4'-dihydroxydiphenyl sulfone (0.5 mol)
63 parts of sodium sulfite (0.5 mol)
202.5 parts of 37% formalin (2.5 mols)

The ingredients are charged into a reaction vessel fitted with a reflux condenser and mechanical means for agitating. The batch is heated under reflux for about 3 hours until a clear viscous syrup is obtained.

The syrup is precured for about 16 hours at 100° C. and finally cured for 16 hours at 150° C. The cured resin is then cooled, ground and evaluated. It has a capacity of 13.8 kilograins of calcium carbonate per cubic foot of resin.

Any alkaline sulfiting agent may be used in place of the sodium sulfite of the example. Such sulfiting agents include other alkali metal sulfites, for example, potassium sulfite, alkali metal bisulfites, for example, sodium metabisulfite, sodium bisulfite liquor, potassium bisulfite, etc. It will be apparent that mixtures of two or more of the sulfiting agents of the type listed above may be utilized in place of any single agent.

I prefer using a molar ratio of formaldehyde to 4,4'-dihydroxydiphenyl sulfone of about 5:1, but the invention is in no sense limited to this particular proportion. More formaldehyde generally produces a resin of no higher capacity while less formaldehyde may result in a more water-soluble product. In general, ratios of from 4:1 to 10:1, formaldehyde to phenolic compound, may be utilized.

I prefer to react phenolic compound and the sulfiting agent in a 1:1 molar ratio. If more sulfiting agent is used the resulting resin has a tendency to swell badly, and if less sulfiting agent is used the resulting resin may have a lower exchange capacity. However, the invention is in no sense restricted to this particular proportion.

At least one molar proportion of formaldehyde must be reacted with the phenolic compound before it is sulfited since presumably only one of the methylol groups is sulfited in the final resin. Evidence for this is the recovery of one mol of sodium hydroxide for each mol of 4:4'-dihydroxydiphenyl sulfone reacted. Accordingly, it is possible within the scope of the present invention to condense the 4,4'-dihydroxydiphenyl sulfone, formaldehyde and sulfiting agent simultaneously or to condense the phenolic compound with the excess of formaldehyde and treat the resulting condensation product with the sulfiting agent. If desired, something less than the total amount of formaldehyde but at least an equimolar quantity thereof may be precondensed with the phenolic compound, the resulting condensation product treated with a sulfiting agent, and the sulfited product then resinified with the remainder of the formaldehyde.

I have found it best to cure the cation exchange resins of the present invention at high temperatures, i. e., about 125°–150° C. If the resin is finally cured at a lower temperature it has a tendency to swell. It is desirable to precure the resins at a lower temperature, about 100° C., but grinding the pre-cured resin before final curing has no particular advantage in that the resin so obtained does not have as good a capacity as one which is not ground between the pre-curing and final curing steps.

A resin of higher capacity may be obtained if the free alkalinity of the reaction mixture, which is due to the molar equivalent of sodium hydroxide liberated in the reaction for every mol of sulfiting agent used, is reduced. This may be accomplished by neutralization with an acid wash. The alkalinity may also be reduced by utilizing a mixture of bisulfite and sulfite as the sulfiting agent.

It is certain that the sulfur of the sulfite group is attached to an aliphatic carbon atom in the final resin; no nuclear sulfonation takes place under the conditions of the reaction.

While I do not wish to be limited to any particular theory as to mechanism of the formation of the cationic synthetic resins of the present invention, I believe that the reaction which occurs may be represented schematically as follows:

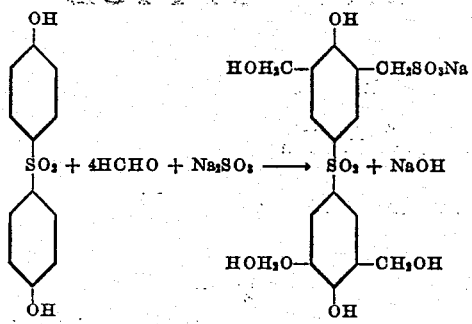

It is an advantage of the present invention that the granular, water-insoluble synthetic resins produced in accordance therewith are capable of exchanging cations in liquid media and of removing cations from liquid media. In this connection, my resinous materials may be used in admixture with other cation active materials or they may be used alone. Furthermore, my resins may be applied before gelation to a suitable carrier such as diatomaceous earth, clay, charcoal, etc. In this way, the active resin is spread on the surface of a relatively inert material and one is thus enabled to employ a smaller quantity of resin than otherwise to obtain the same active area.

Resinous materials prepared according to my invention are useful in the removal of cations from fluid media, especially aqueous solutions. The resins may be used in the hydrogen-activated form to remove cations from solution bases, and they may also be employed as exchange materials in accordance with the principles applied to the use of the natural and synthetic zeolites. Thus, the resin may be activated with a sodium salt such as sodium chloride and upon contact with a solution containing calcium, magnesium or other cations, an exchange of the latter ions for the sodium ions takes place.

The activating solutions or regenerating solutions for my resins are dilute acid solutions or dilute salt solutions, e. g., about 0.2%-10% of sulfuric acid, hydrochloric acid, sodium chloride potassium chloride, etc.

To be sufficiently insoluble for practical use in the art of water purification, a resin should have a sufficiently low solubility that it will not be dissolved away rapidly by the solution to be treated. Thus, water should not dissolve more than about 1 part of resin in 1,000 parts of water when passed through a bed of resin (after the first cycle comprising an activation, exhaustion and reactivation of the resin).

It is preferable to grind and screen the resins to a particle size of from about 8-60 mesh. Use of larger particles causes channeling, and smaller particles of resin have been found to pack, thus reducing the cation exchange efficiency of the material.

My resinous materials are useful for a wide variety of purposes. Some of the uses which may be mentioned by way of example are: water purification; purification of aqueous solutions containing sugar, including sugar juices; purification of water from lead pipes; removal of heavy metal ions from food, beverages and pharmaceutical products; decolorization of solutions containing coloring matters, etc. My condensation products may also be employed to recover valuable metal cations from dilute solutions, e. g., gold from sea water, chromium from chrome tanning liquors, silver from photographic baths, etc. Another important application of our materials is in the absorption or adsorption of gases such as ammonia and the amines, e. g., triethyl amine, methyl amine, etc., from fluid media, either dissolved in a liquid or from vapors.

I claim:

1. A granular, water-insoluble synthetic resinous material having a capacity for exchanging cations in liquid media and obtained by a process which comprises bringing about reaction between 4,4'-dihydroxydiphenyl sulfone, formaldehyde and an alkaline sulfiting agent by heating, until formation of a viscous syrup occurs, curing the syrup by heating at about 125°-150° C., and granulating the cured material to a particle size of from 8 to 60 mesh, relative molar proportions of formaldehyde to 4,4'-dihydroxydiphenyl sulfone being from 4:1 to 10:1 and of 4,4'-dihydroxydiphenyl sulfone to sulfiting agent being 1:1.

2. A process of preparing a granular, water-insoluble, synthetic resinous material having a capacity for exchanging cations in liquid media which comprises bringing about reaction between 4,4'-dihydroxydiphenyl sulfone, formaldehyde and an alkaline sulfiting agent by heating, until formation of a viscous syrup occurs, curing the syrup by heating at about 125°-150° C., and granulating the cured material to a particle size of from 8 to 60 mesh, relative molar proportions of formaldehyde to 4,4'-dihydroxydiphenyl sulfone being from 4:1 to 10:1 and of 4,4'-dihydroxydiphenyl sulfone to sulfiting agent being 1:1.

3. A process of removing cations from liquid media which comprises bringing the liquid media into contact with the granular, water-insoluble synthetic resinous material of claim 1 and separating said liquid media from said material.

4. A process of preparing a granular, water-insoluble synthetic resinous material having a capacity for exchanging cations in liquid media which includes the steps of heating 4,4'-dihydroxydiphenyl sulfone with at least an equimolar proportion of formaldehyde, reacting the condensation product with an alkaline sulfiting agent by heating and curing the reaction product by heating at about 125°-150° C., relative molar proportions of formaldehyde to 4,4'-dihydroxydiphenyl sulfone being from 4:1 to 10:1 and of 4,4'-dihydroxydiphenyl sulfone to sulfiting agent being 1:1.

5. A process of preparing a granular, water-insoluble synthetic resinous material having a capacity for exchanging cations in liquid media which comprises simultaneously condensing 4,4'-dihydroxydiphenyl sulfone, formaldehyde and an alkaline sulfiting agent by heating and curing the condensation product by heating at about 125°-150° C., relative molar proportions of formaldehyde to 4,4'-dihydroxydiphenyl sulfone being from 4:1 to 10:1 and of 4,4'-dihydroxydiphenyl sulfone to sulfiting agent being 1:1.

HAROLD M. DAY.

REFERENCES CITED

The following references are of record in the file of this patent:

UNITED STATES PATENTS

| Number | Name | Date |
|---|---|---|
| 2,228,159 | Wassenegger et al. | Jan. 7, 1941 |
| 2,285,750 | Swain | June 9, 1942 |
| 2,357,798 | Niederhauser et al. | Sept. 12, 1944 |
| 2,372,233 | Thurston | Mar. 27, 1945 |